Dec. 1, 1970 ANG CHEN ET AL 3,544,189
HOLOGRAPHY USING A POLED FERROELECTRIC RECORDING MATERIAL
Filed June 12, 1968 2 Sheets-Sheet 1

INVENTORS: F. S. CHEN
J. T. LA MACCHIA
BY Herbert M. Shapiro
ATTORNEY

United States Patent Office 3,544,189
Patented Dec. 1, 1970

3,544,189
HOLOGRAPHY USING A POLED FERROELECTRIC RECORDING MATERIAL
Fang-Shang Chen, Murray Hill, and John T. LaMacchia, Berkeley Heights, N.J., assignors to Bell Telephone Laboratories, Incorporated, Murray Hill, N.J., a corporation of New York
Filed June 12, 1968, Ser. No. 736,492
Int. Cl. G02b 27/00
U.S. Cl. 350—3.5                                              7 Claims

ABSTRACT OF THE DISCLOSURE

Poled ferroelectric crystals such as lithium niobate and lithium tantalate have been found useful as storage media for volume holograms when the C axis of one such crystal is oriented transverse to the bisector of the angle formed by wave normals of two incident interfering waves. An illustrative arrangement is described along with an explanation of the phenomenon utilized.

FIELD OF THE INVENTION

This invention relates to hologram storage arrangements and, more particularly, to a volume hologram arrangement in which a plurality of images can be stored in a single photosensitive medium.

BACKGROUND OF THE INVENTION

It is well known that a hologram is the recorded interference pattern of two or more coherent waves. One of the waves is usually designated a "reference wave" while the other wave (or waves) is designated a "subject wave" (or waves). It is also well known that any illuminating (interrogate) beam directed at a photosensitive medium in which a hologram is stored is incident at the Bragg angle in order to reconstruct the stored image efficiently.

In this context then, a photosensitive medium positioned in the path of intersecting reference and subject waves may be used to record the interference patterns established by the intersecting waves. Specifically, two coherent monochromatic plane waves travelling in different directions but overlapping in space form sets of interference planes parallel to the bisector of the normals to the wavefronts and separated by a distance related to both the wavelength of the light employed and the angular separation between wavefronts in a well known manner. When a photosensitive medium is placed in this overlap region, the interference planes form, throughout the bulk of the medium, planes which manifest themselves either as transmittance or refractive index variations. These last-mentioned planes occur periodically throughout the medium, and thus form a diffraction grating.

The phenomenon is easily vizualized in terms of planar wavefronts. The photosensitive medium functions as a fine grating structure in which changes in the transmittance or refractive index of the medium are caused by light in accordance with interference patterns formed by two or more light wavefronts. When, for example, two interfering planar light wavefronts are projected into a suitable photosensitive medium, the interference planes define at their intersection a line of constant intensity which is moving normal to the plane of the medium. Consecutive planar wavefronts, thus, intersect one another along a set of lines moving perpendicular to the plane of the medium.

As the waves progress in the direction of the wave normals, these lines generate planes in the medium. In terms of antinodal fronts, planes of maximum light transmittance are generated in the photosensitive medium. These planes are perpendicular to the plane of the medium, bisect the angle between the wave normals, are parallel to one another, and occur periodically throughout the medium. Intermediate the planes of maximum light transmittance, planes of lesser transmittance occur.

The structure of the hologram is determined by these generated planes. If the photosensitive medium were a photographic emulsion, for example, the exposure and development process results in the precipitation of silver atoms over the surface of the generated planes in proportion to the intensity of light in those planes. The result is a more or less sinsuoidal variation of silver precipitate in the medium which constitutes the structure of the grating and thus the hologram recording. A hologram of a subject containing many plane waves, accordingly, comprises a plurality of such gratings, variously oriented throughout the medium and having various angular spacings.

When the gratings are later illuminated, light at only a particular angle of incidence is transmitted through the gratings in such a way that the wavefronts reflected by each of the gratings interfere constructively so as to form a reconstruction of the stored image. This angle is defined as the Bragg angle.

It is also known that more than one hologram image can be stored in a single photosensitive medium in the foregoing manner by repositioning the medium relative to the reference beam each time an image is stored. The repositioning is effected conveniently by rotating the photosensitive medium slightly about an axis at the intersection of the plane of the medium and a central plane of a grating formed therein as described above. Bragg's condition is satisfied by light at a different incident angle for each set of planes thus permitting different images to be reconstructed.

The number of hologram images which can be stored in a medium depends on the thickness of that medium. Photoresist gelatin films, which are suitable for multiple image production, can be made no thicker than the order of 10 microns and in practice store relatively few images. Photochromic materials, on the other hand, can be made sufficiently thick for storing numbers of hologram images. But images in these materials fade with repeated reconstruction. Further the diffraction efficiency of photochromic materials is relatively low because the hologram planes correspond to transmittance rather than refractive index variations. Theromplastics have also been used to this end. Films of thermoplastic material, however, are not only thin but have relatively low resolution.

BRIEF DESCRIPTION OF THE INVENTION

It has been found that poled ferroelectric crystals such as lithium niobate ($LiNbO_3$) and lithium tantalate ($LiTaO_3$) exhibit localized changes of refractive indices when exposed to laser radiation. The changes are thought to be due to the separation of charges in the medium when the medium is illuminated. The use of this effect for the storing of digital information is disclosed in copending application Ser. No. 627,492, filed Mar. 31, 1967 for F-S. Chen and R. T. Denton (now Pat. 3,383,664 issued May 14, 1968).

This invention is based on the realization that the separation of charges which produces changes in refractive indices in poled ferroelectric crystals takes place along the C axis of such a crystal. Consequently, if a crystal is disposed such that wavefronts are incident thereto so that the bisector of the angle between the reference wave and any of the subject waves is not parallel to the C axis of the crystal, suitable gratings can be formed therein to permit the reconstruction of one of many hologram images in response to interrogate light satisfying the Bragg condition for the selected image.

Suitable crystals can be made arbitrarily thick and experiments on the storage of holograms in such crystals indicate that large numbers of images can be stored indeed, each corresponding to a different angle of incidence. Not only is the storage of multiple images achievable, but no processing of the material is necessary, the images are highly stable, and the images are erasable by heating to above 160 degrees centrigrade or by illumination from a mercury lamp.

Accordingly, a feature of this invention is a hologram storage arrangement including a crystal of a poled ferroelectric material which exhibits localized changes in the index of refraction thereof when exposed to radiation.

Another feature of this invention is a hologram storage arrangement including means for providing first and second wavefronts which interfere with one another along lines parallel to the bisector of the angle formed by the wavefront normals, and a crystal of a poled ferroelectric material which exhibits localized separation of charges along a first axis therein when exposed to such wavefront, wherein the crystal is disposed in the path of the interfering wavefronts and oriented such that the first axis of the crystal is transverse to those lines.

DETAILED DESCRIPTION

Figure 1:
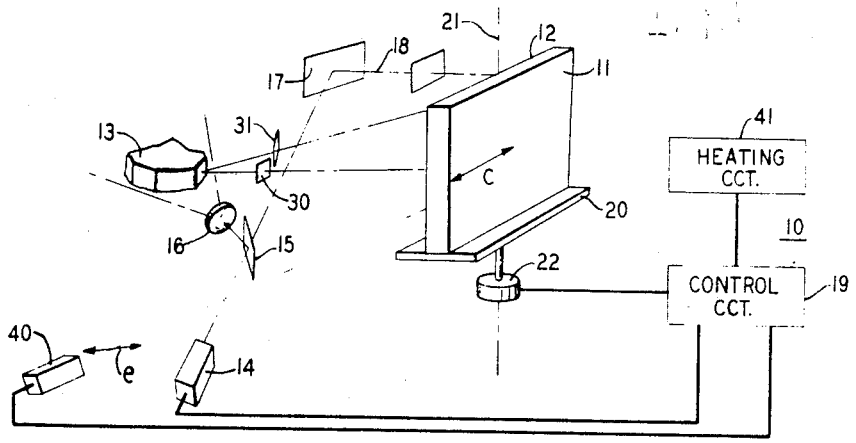
FIG. 1 is a schematic illustration of a hologram arrangement in accordance with this invention.

FIG. 1 shows an arrangement 10 in accordance with this invention. The arrangement includes a photosensitive medium 11 which comprises a single crystal of a poled ferroelectric material such as lithium niobate or lithium tantalate. A major surface 12 of crystal 11 faces a subject 13 of which a hologram image is to be formed in crystal 11. A laser 14 is directed at subject 13 by a beam splitter 15 and a lens 16 so that light reflected from that subject is incident upon surface 12 of crystal 11. The undeflected position of the laser beam is deflected by mirror 17 and is incident upon surface 12 forming the reference beam 18 for the hologram. Laser 14 is connected to a control circuit 19 for energization.

Crystal 11 is mounted on a platform 20 rotatable about an axis 21 perpendicular to the C axis of crystal 11 which is represented by double headed arrow C in FIG. 1. Rotation of platform 20 is by means of a micromanipulator mechanism 22 also under the control of control circuit 19.

For forming a hologram image of subject 13 in crystal 11, the crystal is oriented so that interference planes defines by the reference and subject beams are not parallel to the C axis of the crystal.

Figure 2:
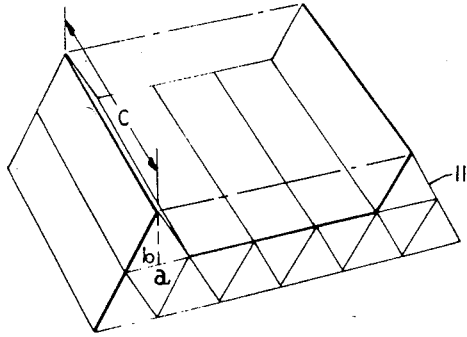
FIGS. 2, 3, and 4 are schematic illustrations of portions of the arrangement of FIG. 1.

A poled ferroelectric crystal has a trigonal structure shown in FIG. 2 to have wedge geometry and a triangular end. The base of the triangular end of the wedge is designated the $a$ axis of the crystal, the height of the triangular end is designated the $b$ axis, and the length of the wedge is designated the $c$ axis. Crystal 11, then, has a trigonal structure with a $c$ axis as shown in the figure. The crystal can be made of arbitrary size.

Light from laser 14 is reflected from subject 13 in what may be thought of as a superposition of wave planes such as planes 30 and 31 shown in FIG. 1. These planes are represented as broken lines in FIG. 3. The wave plane normals are designated 30N and 31N, respectively, in FIG. 3.

Figure 3:
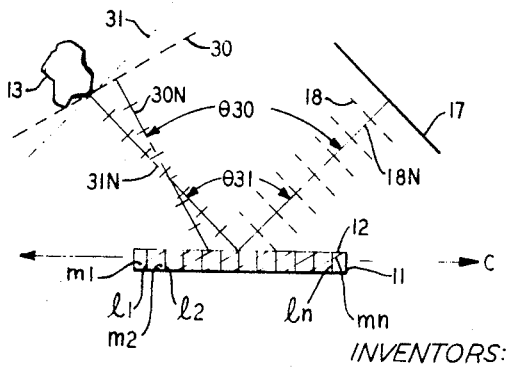

Consecutive wave planes of reflected light from subject 13 and the reference wave 18 intersect one another. Each pair of intersecting wave planes generates a set of interference planes in crystal 11, each plane being displaced from a next adjacent plane a distance related to the angular separations $\theta 30$ and $\theta 31$ with respect to the normal 18N of reference beam 18 shown in FIG. 3, and the wavelength of the incident light. In a top view, the planes appear as lines $l1 \ldots ln$ corresponding to the interference between waves 31 and 18 and lines $m1 \ldots mn$ corresponding to the interference between waves 30 and 18 as shown in FIG. 3.

Figure 4:
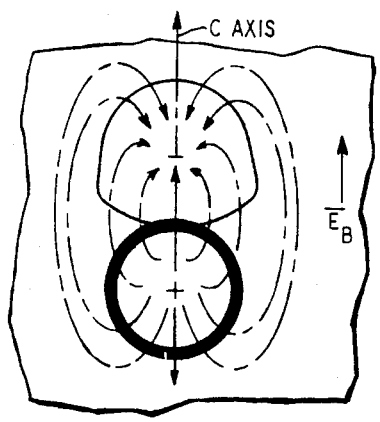

The nature of these planes is explained in connection with FIG. 4. An illustrative crystal of say lithium niobate is characterized by a localized change in the index of refraction of the crystal when a laser beam is incident thereto. FIG. 4 shows an encircle plus sign as the site of an incident laser beam. It is theorized that electrons freed by the incident beam migrate along the C axis to become fixed in positions spaced apart from the position of the incident beam when that beam is terminated. The spaced apart charges remain fixed in the absence of the beam giving rise to an electric field $\overline{E}_B$ along the C axis of the material.

Each line of intersection between two wave planes causes a similar separation of charge. The number of charges so separated is proportional to the intensity of incident light. Consequently, the result of a line of intersection between two wave palnes passing through the photosenstive material may be visualized as two spaced apart planes of opposite charges. A field is generated between these two charged planes, the strength thereof at any particular position being proportional to the number of charges between the two planes at that position.

It is this field which gives rise to changes in the refractive index of the crystal 11 when interrogate light is later incident thereto for reconstructing a stored image. Accordingly, the two charge planes may be visualized as a single "field" plane. Since these ferroelectric crystals are electro-optic, the presence of such localized field planes changes the refractive index of the medium in these planes. As a result, the phase of an interrogate wave is altered.

Figure 5:
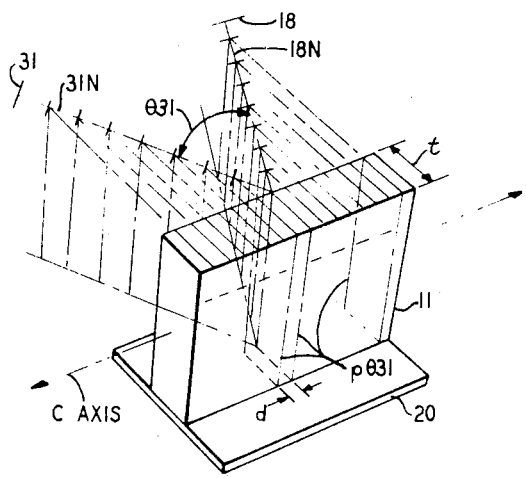
FIG. 5 and 6 are schematic illustrations of portions of gratings formed in a photosensitive medium in accordance with this invention.

FIG. 5 shows wave planes 31 and 18 in relationship to crystall 11. The normals 31N and 18N are shown at an angle $\theta 31$ to one another. A field plane is formed in crystal 11 at each intersection of two incident wave planes. These planes are designated P$\theta 31$ for wave planes incident at the angle $\theta 31$ and may be taken to correspond to the antinodal condition. For simplicity, only the planes for this condition are shown. There are additional parallel planes between those represented, however, as mentioned above.

The grating which constitutes the hologram in accordance with this invention therefore comprises a plurality of field planes defined by a separation of charges along the C axis of a poled ferroelectric crystal. In order to achieve the requisite separation of charges, the C axis is aligned other than parallel to the planes generated by the lines of intersection between two incident wave planes. For maximum charge separation, the C axis is normal to each field plane. A suitable response has already been achieved, however, when platform 20 of FIG. 1 is rotated 60 degrees from the normal orientation and even further rotation is expected to be suitable.

Figure 6:
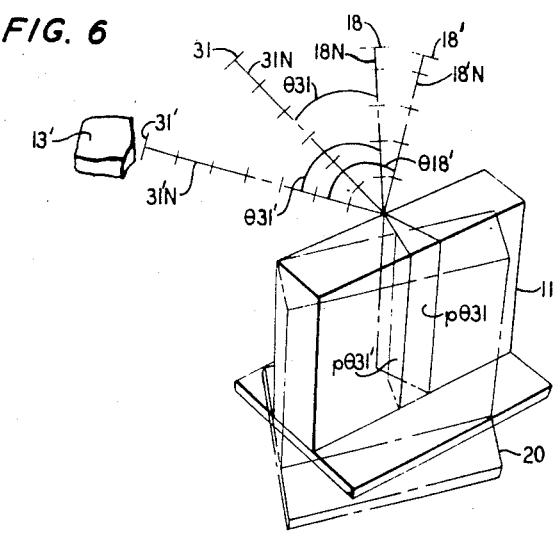

It is this field which permits the volume hologram to be realized as well. A different image may be stored in crystal 11 each time the crystal is rotated approximately .01° per cm. thickness of crystal, the minimum angular separation $\Delta\theta$ being approximately equal to $2d/t$ where $d$ is the mean spacing of the gratings and $t$ is the thickness of the crystal as shown in FIG. 5. FIG. 6 shows crystal 11 rotated counterclockwise as viewed in FIG. 3 about an axis (not shown) perpendicular to the C axis of the crystal. This allow storage of another hologram of a different subject 13'. The intersection of the reference wave and the new subject waves generates a new set of interference planes a representative one of which is identified as $P\theta 31'$ shown in relationship to a corresponding plane $P\theta 31$ of FIG. 5 formed prior to rotation of the plane. An additional grating is formed in this manner in response to incident wave planes each time the crystal is rotated. Only negligible degradation of previously stored images is observed.

A volume hologram can be formed without rotating crystal 11. The angle formed by the wave normals can be altered, instead, to produce like results. This organization is illustrated also in FIG. 6 which shows an angle $\theta 18'$ defined between two wave normals, $18'N$, the new reference wave, and $31'N$ the new subject wave formed when subject 13 is moved to a primed (13') position. A grating corresponding to a plurality of field planes $P\theta 31'$ is formed.

It is important to emphasize that gratings are not formed in accordance with this invention when the C axis of crystal 11 is aligned with the orientation of a field plane. As long as the C axis is out of the orientation of the field plane, charge separation can be achieved as discussed in connection with FIG. 4 and a field plane can be formed. The field planes function to change the phase of interrogate light for reconstructing the stored images. This due to the electro-optic effect in the medium. In the absence of the field planes, no hologram is realized.

We have described a mechanism for the formation of phase gratings in poled ferroelectric crystals for forming volume holograms. The actual formation of the grating is in response to a burst of polarized light from laser 14 under the control of control circuit 19. In FIG. 1, the beam from laser 14 is directed at subject 13 as well as being partially split off to form a reference beam. One might visualize the storage of images such as the letter A which may constitute subject 13. After completing an exposure, subject 13 is replaced by subject 13' which may be the letter B, and the angle between the normals 31N and 18N of FIG. 5 is altered as shown in FIG. 6. All the letters of the alphabet, then, could be stored each at a characteristic crystal orientation or reference beam angle, as described above.

Poled ferroelectric crystals offer a high potential capacity for information storage. A thin hologram is already known to be capable of storing a number of bits of information of the order of the resolution achievable therein. This is, for example, $4 \times 10^8$ bits/cm.$^2$ in typical emulsions used for holography. But $$\frac{\pi}{\Delta\theta} = \pi \times 10^3$$

efficient, distinct holograms can be stored in a one centimeter thick sample of say, single crystal lithium niobate. Consequenlty a 1 cm.$^3$ crystal is capable of of storing $10^{12}$ bits of information.

A further useful application of the material is multicolor hologram storage. A thick grating has high angle sensitivity. Since the Bragg angle depends on wavelength, it also has a high wavelength selectivity. Consequently, a color hologram can be reconstructed with white light free from color crosstalk.

Reconstruction of holograms can be obtained in response to laser beams typically of longer wavelength than the beam used to form the hologram. For example, laser 14 of FIG. 1 may comprise an argon ion laser operating at 4880 A. (angstrom units) having an output of tens of milliwatts for forming the hologram whereas a laser 40 also shown in FIG. 1 and employed for reconstructing holograms may comprise a He-Ne laser operating at 6328 A. Again, light is incident at the Bragg angle to provide constructive interference of light reflected from the gratings.

Typical data obtained with a lithium niobate crystal 0.9 cm. thick is as follows.

(1) Reconstruction efficiency: 30%–40%
(2) Resolution: 1600 lines/mm.
(3) Optical energy required for writing:
    100 joules/cm.$^2$ at $\lambda = .488\mu$
(4) Angular resolution $(\Delta\theta): 2 \times 10^{-4}$ radians
(5) Erasure at a temperature of 160° C.

Reconstruction of stored images is advantageously carried out with the extraordinary ray of the incident light because the change in the extraordinary index of refraction in a poled ferroelectric crystal has been found to be about four times larger than that of the ordinary index for a given exposure. More specifically, each incident light beam is resolvable into two mutually orthogonal components, as is well understood. One component is commonly called the extraordinary ray and is aligned herein conveniently with a component of its electric field vector parallel to the C axis of crystal 11, as indicated by a double headed arrow C in FIG. 1, for most efficient operation.

Erasure of crystal 11 is realized by heating the crystal to above about 160 degrees centigrade. This is accomplished in a variety of well known ways. Block 41 of FIG. 1 represents an illustrative means under control of circuit 19.

What has been described is considered only illustrative of the principles of this invention. Numerous other arrangements in accordance with the principles of this invention may be devised by one skilled in the art without departing from the spirit and scope thereof.

What is claimed is:

1. A volume hologram storage arrangement comprising a single crystal of a poled ferroelectric material exhibiting a persistent separation of charges along a first axis when exposed to electromagnetic radiation, said crystal having a thickness to permit the storage of multiple images therein when rotated to different orientations about an axis perpendicular to said first axis, means for directing at said crystal first and second beams of electromagnetic radiation having wavelengths and intensities to generate an interference pattern in a manner to cause said pattern to be stored as persistent charge separations within said crystals when said first beam is modulated, means for modulating said first beam in accordance with an image-representative pattern, said first and second beams defining a first angle therebetween, said crystal being oriented such that said first axis is transverse to the bisector of the first angle.

2. A storage arrangement in accordance with claim 1 wherein said crystal has a trigonal crystal structure having a C-axis and said first axis comprises said C-axis.

3. A storage arrangement in accordance with claim 2 including means for rotating said crystal about an axis perpendicular to said C-axis.

4. A storage arrangement in accordance with claim 3 including means for reconstructing images stored in said crystal.

5. A storage arrangement in accordance with claim 4 wherein said last-mentioned means includes means for directing at said crystal a beam of light having an electric field component parallel to said first axis.

6. A storage arrangement in accordance with claim 3 wherein said crystal is selected from a group consisting of lithium niobate and lithium tantalate.

7. A storage arrangement in accordance with claim 6 also including means for heating said crystal to a temperature to erase gratings stored therein.

References Cited

UNITED STATES PATENTS

| | | | |
|---|---|---|---|
| 3,383,664 | 5/1968 | Chen et al. | 350—150 |
| 3,444,316 | 5/1969 | Gerritsen | 350—3.5 |

OTHER REFERENCES

Ashkin et al., Applied Physics Letters, vol. 9, No. 1, July 1966, pp. 72–74.

DAVID SCHONBERG, Primary Examiner

R. J. STERN, Assistant Examiner

U.S. Cl. X.R.

340—173; 350—147